(«12») United States Patent
Yang (10) Patent No.: US 11,701,991 B2
(45) Date of Patent: Jul. 18, 2023

(54) TRAY DEVICE FOR VEHICLE AND LOCKING DEVICE FOR TRAY DEVICE (71) Applicant: NIFCO KOREA INC., Asan-si (KR)

(72) Inventor: Hyo Keun Yang, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 0 days.

(21) Appl. No.: 17/506,141

(22) Filed: Oct. 20, 2021

(65) Prior Publication Data
US 2022/0126738 A1 Apr. 28, 2022

(30) Foreign Application Priority Data
Oct. 22, 2020 (KR) .................. 10-2020-0137602

(51) Int. Cl.
*B60N 3/00* (2006.01)
*F16D 63/00* (2006.01)

(52) U.S. Cl.
CPC ........... *B60N 3/002* (2013.01); *F16D 63/006* (2013.01)

(58) Field of Classification Search
CPC ............ B60N 3/002; E04B 2002/7464; H01R 13/625
USPC ........................ 108/44; 248/222.13, 222.52
See application file for complete search history.

(56) References Cited

U.S. PATENT DOCUMENTS

| | | | | |
|---|---|---|---|---|
| 3,026,159 A * | 3/1962 | Miller | ................... | B25H 3/06 108/1 |
| 8,336,956 B2 * | 12/2012 | Westerink | .......... | B64D 11/0638 297/145 |
| 8,359,982 B2 * | 1/2013 | Lebel | .................. | A47B 3/00 108/7 |
| 2005/0045071 A1 * | 3/2005 | Lindstrom | ............. | B60N 3/002 108/44 |
| 2008/0250983 A1 * | 10/2008 | Sundarrao | ................ | A47B 3/00 108/44 |
| 2010/0319588 A1 * | 12/2010 | Hanna | ................... | B60N 3/001 108/20 |
| 2014/0261097 A1 * | 9/2014 | Eilers | .................... | B60N 3/001 108/44 |
| 2015/0183355 A1 * | 7/2015 | Chang | ................... | B60N 3/002 108/44 |
| 2015/0284088 A1 * | 10/2015 | Gow | .................. | B64D 11/0605 108/44 |
| 2019/0143870 A1 * | 5/2019 | Kondrad | .................. | B60N 2/32 108/44 |
| 2019/0291869 A1 * | 9/2019 | Mehlos | .............. | B64D 11/0605 |

(Continued)

FOREIGN PATENT DOCUMENTS

JP H7-37812 U 7/1995
KR 20-0440039 Y1 5/2008

OTHER PUBLICATIONS

Office Action for Japanese Patent Application No. 2021-172185 dated Sep. 6, 2022.

*Primary Examiner* — Jose V Chen
(74) *Attorney, Agent, or Firm* — Thomas Horstemeyer, LLP (57) ABSTRACT

A tray device for a vehicle includes a tray having a storage space capable of storing an article, a tray cover rotatably installed on the tray to open and close the storage space and including a coupling plate having a heart cam groove, and a locking device fixedly installed on an outer surface of the tray.

8 Claims, 7 Drawing Sheets

(56) References Cited

U.S. PATENT DOCUMENTS

2022/0135230 A1\* 5/2022 Satterfield .......... B64D 11/0638
108/44

\* cited by examiner

TRAY DEVICE FOR VEHICLE AND LOCKING DEVICE FOR TRAY DEVICE

CROSS-REFERENCE TO RELATED APPLICATION

This application is based upon and claims the benefit of priority from Korean Patent Application No. 10-2020-0137602, filed on Oct. 22, 2020, the entire contents of which are incorporated herein by reference.

TECHNICAL FIELD

The present disclosure relates to a tray device for a vehicle and a locking device for a tray device, and more particularly, to a device for preventing a tray cover from being unlocked and opened by an external impact.

BACKGROUND

In general, a tray of a vehicle includes a housing for accommodating articles and a cover for opening and closing an opening of the housing. In most examples, the cover is configured to be rotatably installed in the housing to open and close the opening.

In usual cases, a cover locking device is provided to maintain the closed state of the cover.

If the cover is opened while a vehicle is being driven, the articles stored in the housing may spill out, which is dangerous. Therefore, the closed state of the cover must be reliably maintained.

Conventional cover locking devices of trays for vehicles have a problem in that the cover may be unlocked and opened by an external impact generated while the vehicle is being driven.

SUMMARY

The present disclosure provides a device that prevents a cover from being opened by an impact applied while a vehicle is being driven and consequently prevents articles inside a housing from spilling out.

The present disclosure provides a device that can be easily manufactured with a small number of parts to reduce costs, can miniaturize parts so that a small space is required, and can facilitate an operation of locking a cover.

One aspect of the present disclosure provides embodiments of a tray device for a vehicle. A tray device for a vehicle according to a representative embodiment includes: a tray having a storage space capable of storing an article; a tray cover rotatably installed on the tray to open and close the storage space and including a coupling plate having a heart cam groove; and a locking device fixedly installed on an outer surface of the tray.

The locking device may include: a rotary pin inserted into the heart cam groove; a rotator to which the rotary pin is coupled to protrude from a surface of the rotator to one side direction; a cover into which a portion of the rotator on the other side direction opposite to the one side direction is inserted therethrough; a sensor housing fixedly coupled to a portion of the cover on the other side direction and having a guide groove formed to penetrate a middle portion of the sensor housing; a weight configured to move while being guided along the guide groove; and a rotary holder configured to maintain a seated state of the weight in the guide groove and rotate the rotator when the weight is moved.

The guide groove may be formed so that both end portions of the guide groove in a front-rear direction are bent upward.

The rotary holder may include pressing surfaces configured to pivotally rotate the rotary holder by being pushed by the movement of the weight and to be obliquely bent at upper and lower portions of the rotary holder, respectively.

The locking device may further include a contact protrusion protruding from an edge of the guide groove in a direction facing the cover.

The locking device may include a rotary pin inserted into the heart cam groove, and a locking force maintaining groove and an operation groove may be formed in the heart cam groove to communicate with each other so that the rotary pin is capable of being drawn into and withdrawn from the locking force maintaining groove and the operation groove.

The locking force maintaining groove may be formed in the heart cam groove to be located in an upper direction of the operation groove.

The locking device may further include an O-ring installed between the rotator and the cover to fill a gap between the rotator and the cover.

Another aspect of the present disclosure provides embodiments of a locking device for a tray device.

BRIEF DESCRIPTION OF DRAWINGS

The accompanying drawings, which are incorporated in and constitute a part of the specification, illustrate embodiments of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have meanings generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising," "including," "having," and the like are to be understood as open-ended terms having the possibility of encompassing other embodiments, unless otherwise mentioned in the phrase or sentence containing such expressions.

In the present disclosure, where it is mentioned that one element is "connected" to another element, it is to be understood that said one element may be directly connected to another element or may be connected to another element via a new additional element.

The expressions indicating directions such as "front (F)," "rear (R)," "up (U)," "down (D)" and the like used in the present disclosure, are defined as indicated in the drawings. The expressions for the respective directions are used to facilitate explanation so that the present disclosure can be clearly understood. The directions may be defined differently depending on what the reference is.

Hereinafter, technical configurations of the present disclosure will be described in detail with reference to FIGS. 1 to 9.

Figure 1:
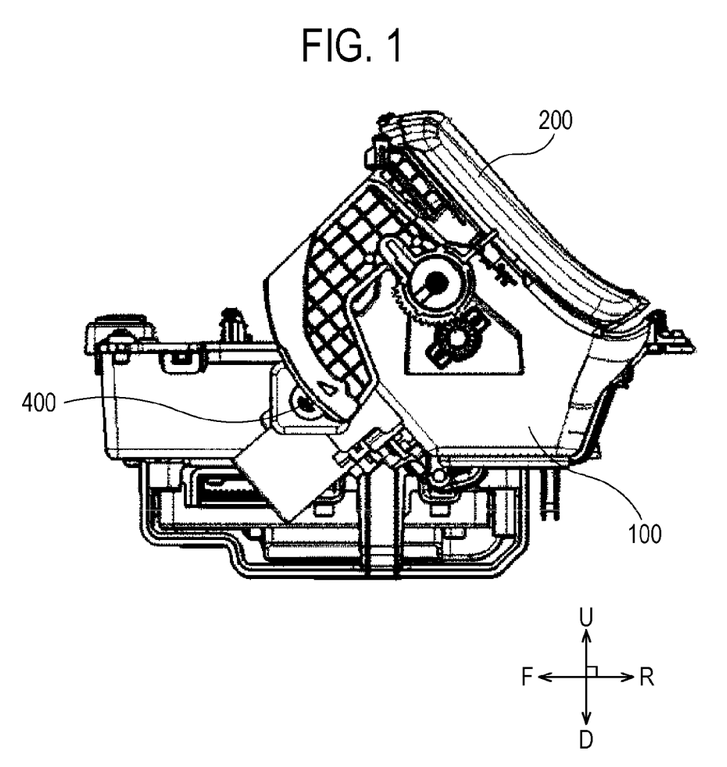
FIG. 1 is a perspective view showing a tray device for a vehicle according to an embodiment of the present disclosure.

Referring to FIG. 1, a tray device for a vehicle according to an embodiment of the present disclosure includes: a tray 100 having a storage space capable of storing an article; a tray cover 200 rotatably installed on the tray 100 to open and close the storage space and including a coupling plate 210 having a heart cam groove 310; and a locking device 400 fixedly installed on an outer surface of the tray 100.

Figure 2A:
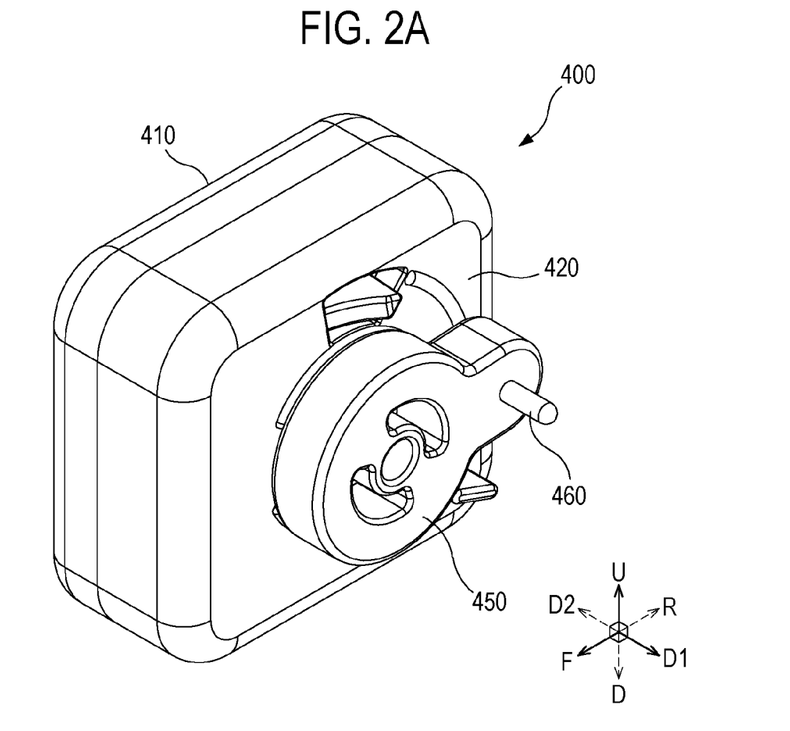
FIG. 2A is a perspective view showing a locking device for a tray device according to an embodiment of the present disclosure.
Figure 2B:
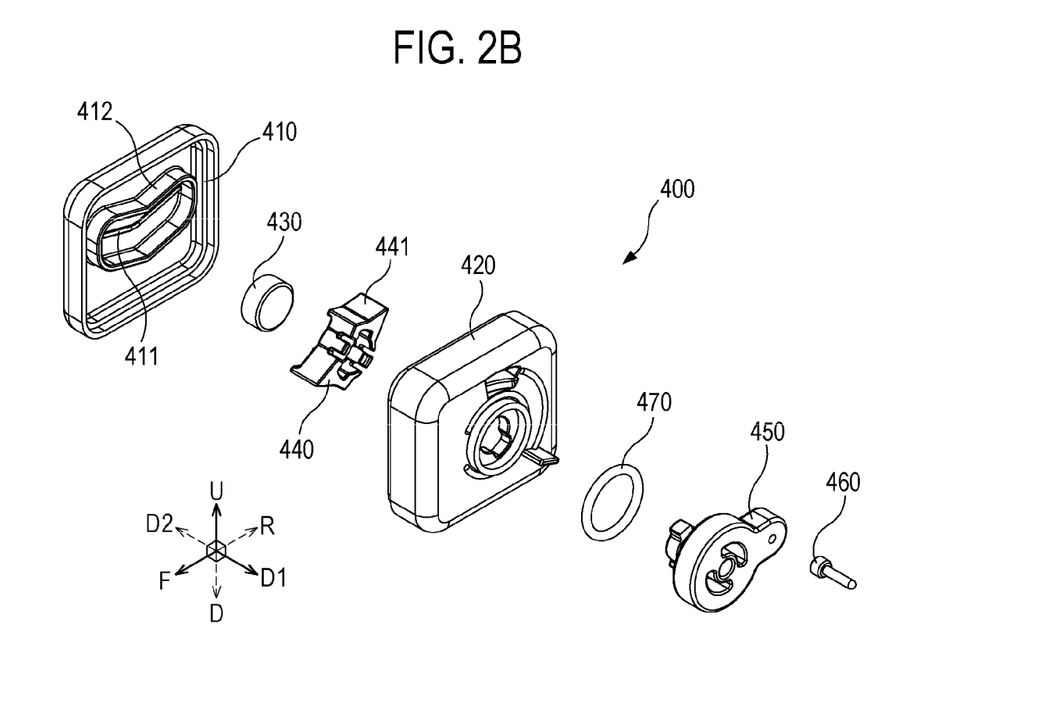
FIG. 2B is an exploded perspective view showing a configuration of the locking device for a tray device shown in FIG. 2A.
Figure 3:
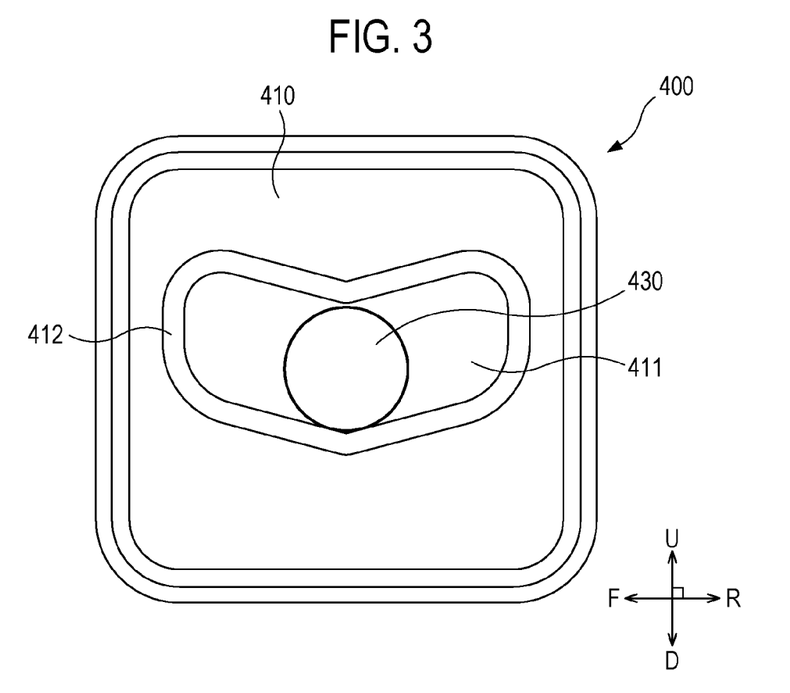
FIG. 3 is an elevational view showing a state in which a weight of the locking device for a tray device shown in FIG. 2B is installed in a sensor housing.

Referring to FIGS. 2A and 2B, the locking device 400 includes: a rotary pin 460 inserted into the heart cam groove 310; a rotator 450 to which the rotary pin 460 is coupled to protrude from a surface of the rotator 450 to one side direction D1; a cover 420 into which a portion of the rotator 450 on the other side direction D2 opposite to the one side direction D1 is inserted therethrough; a sensor housing 410 fixedly coupled to a portion of the cover 420 on the other side direction D2 and having a guide groove 411 formed to penetrate a middle portion of the sensor housing 410; a weight 430 configured to move while being guided along the guide groove 411; and a rotary holder 440 configured to maintain a seated state of the weight 430 in the guide groove 411 and rotate the rotator 450 when the weight 430 is moved.

Referring to FIGS. 3 to 5C, the guide groove 411 may be formed so that both end portions of the guide groove 411 in a front-rear direction (F, D) are bent upward. The rotary holder 440 may include pressing surfaces 441 configured to pivotally rotate the rotary holder 440 by being pushed by the movement of the weight 430 and to be obliquely bent at the upper and lower portions of the rotary holder 440, respectively. When an external force is applied to the tray device, the weight 430 moves in a direction opposite to a direction of the external force along the guide groove 411 due to inertia. In the embodiment in which both end portions of the guide groove 411 are bent upward, the weight 430 can move in the direction opposite to the direction of the external force and can move upward along the guide groove 411 to rotate the rotator 450.

The locking device 400 may further include a contact protrusion 412 protruding from an edge of the guide groove 411 in the direction D1 facing the cover 420. The contact protrusion 412 may protrude in the direction D1 and extend along the edge of the guide groove 411.

In the heart cam groove 310, a locking force maintaining groove 310a and an operation groove 310b may be formed to communicate with each other so that the rotary pin 460 is capable of being drawn into and withdrawn from the locking force maintaining groove 310a and the operation groove 310b.

The locking force maintaining groove 310a may be formed in the heart cam groove 310 so that the locking force maintaining groove 310a is located in an upper direction of the operation groove 310b. In a state in which the weight 430 is moved by an impact generated while the vehicle is being driven, the rotator 450 is rotated to move the rotary pin 460 upward. At this time, when the tray cover 200 is pressed, the rotary pin 460 is drawn into the locking force maintaining groove 310a (see FIG. 6). Even if the tray cover 200 is subsequently rotated in an opening direction, the rotary pin 460 is drawn out from the locking force maintaining groove 310a and caught on the heart cam 300 (see FIG. 7), so that the tray cover 200 cannot be opened. In a state in which the weight 430 is returned to an original position, when the tray cover 200 is pressed, the rotary pin 460 is drawn into the operation groove 310b. Thereafter, when the tray cover 200 is rotated in the opening direction, the rotary pin 460 moves along the heart cam groove 310 without being caught by the heart cam 300 (see FIG. 8), so that the tray cover 200 can be opened. Thus, an occupant of the vehicle may release the locking force of the tray cover 200 as necessary.

The locking device 400 may further include an O-ring 470 installed between the rotator 450 and the cover 420 to fill a gap between the rotator 450 and the cover 420. Accordingly, when the rotary holder 440 rotates, there is no play between the rotator 450 and the cover 420, so that the rotator 450 can rotate smoothly.

One side portion of the weight 430 is movably inserted into the sensor housing 410. The other side portion of the weight 430 is movably coupled to one side surface of the rotary holder 440.

One pressing surface 441 and other pressing surface 441 are respectively formed in upper and lower portions of the rotary holder 440. The one pressing surface 441 is formed on the upper portion of the rotary holder 440, and the other pressing surface 441 is formed on the lower portion of the rotary holder 440. The other side portion of the weight 430 may be coupled to the one side surface of the rotary holder 440 so that the one pressing surface 441 and the other pressing surface 441 are maintained in contact with the contact protrusion 412.

After the rotary holder 440 is coupled to the weight 430, the cover 420 is coupled to the sensor housing 410, and an other side portion of the rotator 450 having one side surface, to which the rotary pin 460 is coupled to protrude therefrom, is inserted into the cover 420 and coupled to the rotary holder 440, thereby the assembly of the locking device 400 can be completed.

After assembling the locking device 400, the locking device 400 may be fixedly installed on the outer surface of the tray 100 so that the rotary pin 460 is inserted into the heart cam groove 310 of the heart cam 300 formed on the coupling plate 210 of the tray cover 200. In this case, the locking device 400 may be installed on the tray 100 so that the rotary pin 460 is positioned between the locking force maintaining groove 310a and the operation groove 310b.

Figure 4:
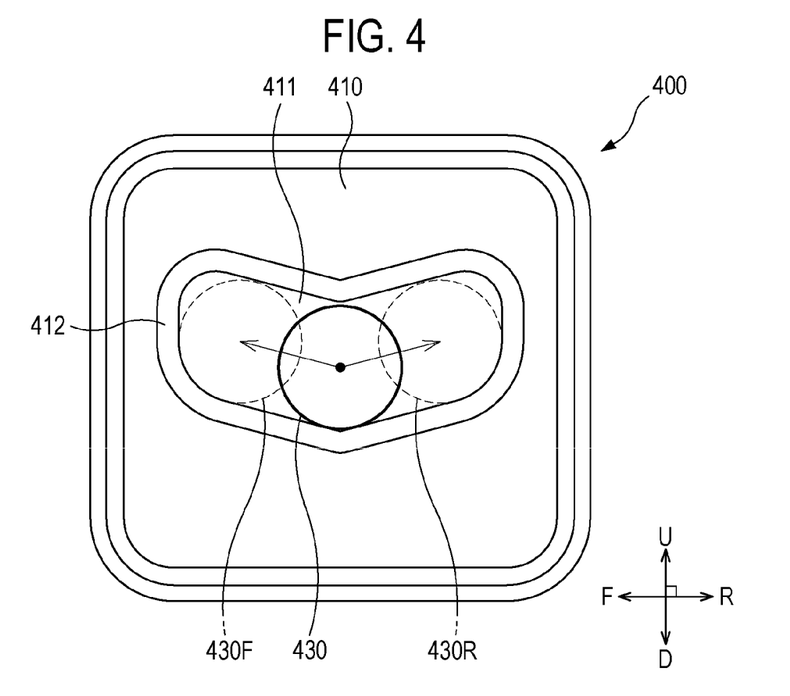
FIG. 4 is an operation state diagram showing a state in which the weight of the locking device for a tray device shown in FIG. 3 moves forward or rearward.
Figure 5A:
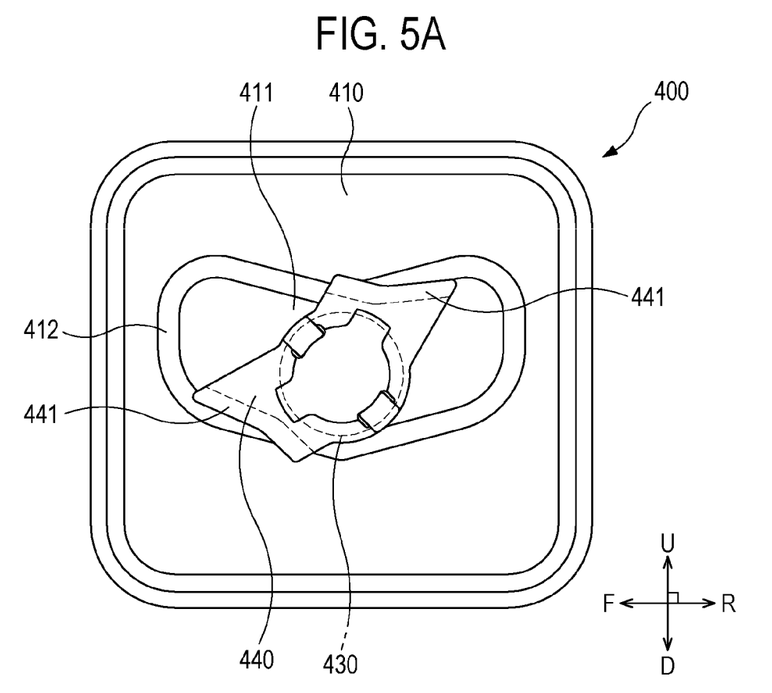
FIG. 5A is an operation state diagram showing a state of a rotary holder when the weight of the locking device for a tray device shown in FIG. 3 is at an original position.
Figure 5B:
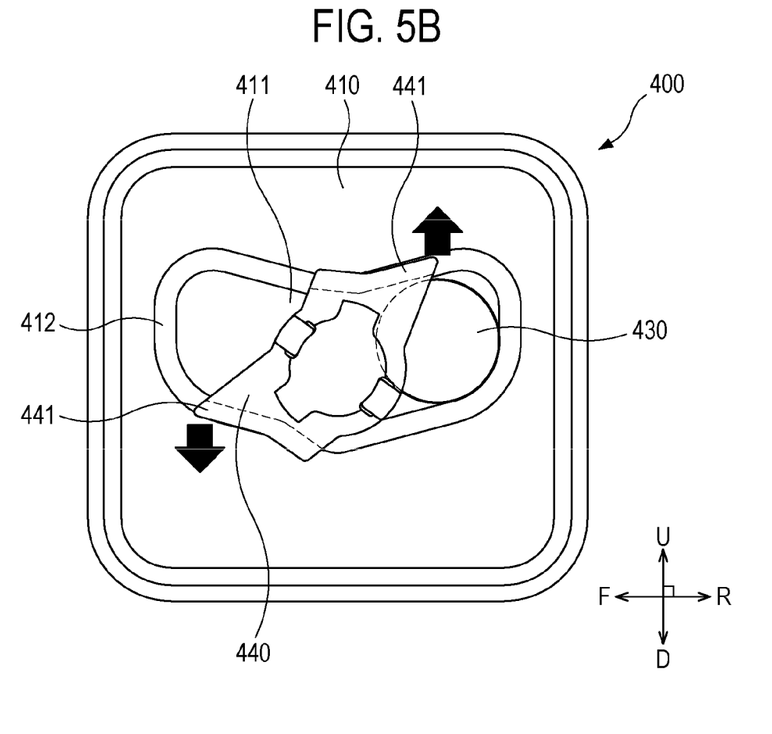
FIG. 5B is an operation state diagram showing a state in which the rotary holder is rotated while the weight of the locking device for a tray device shown in FIG. 5A moves rearward.
Figure 5C:
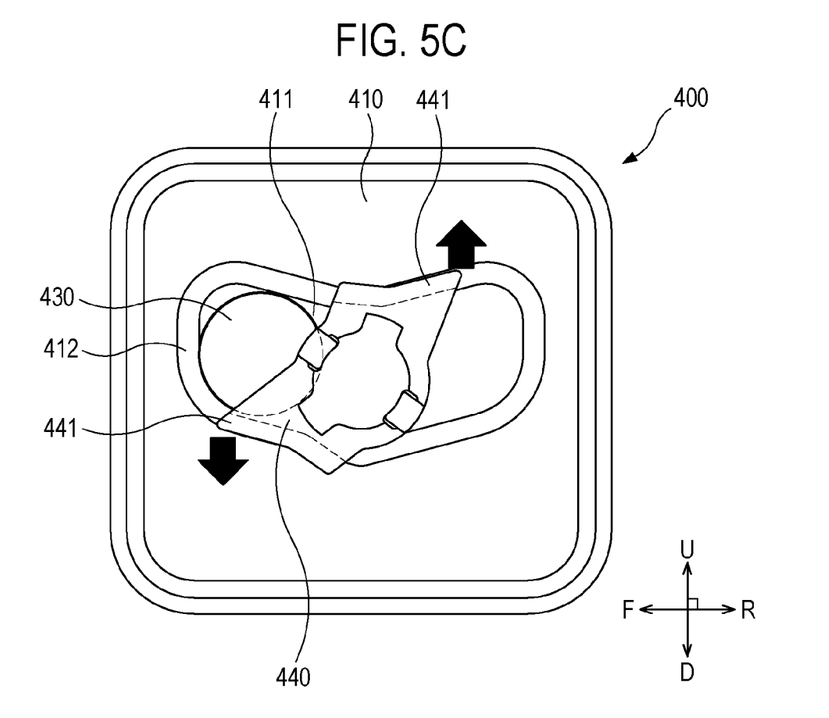
FIG. 5C is an operation state diagram showing a state in which the rotary holder is rotated while the weight of the locking device for a tray device shown in FIG. 5A moves forward.

Referring to FIG. 4, when an impact load is transmitted to the tray 100 due to a collision accident on the front or rear side of the vehicle while being driven, the weight 340 momentarily moves forward or rearward while being guided along the guide groove 411 in the impact load receiving direction (i.e., in the direction opposite to a direction of the impact load). For example, the weight 430 can move rearward due to inertia (see 430R) when an external force acts from the rear side to the front side, and the weight 430 can move forward due to inertia (see 430F) when an external force acts from the front side to the rear side. For example, when an external force acts from the upper side to the lower side, the weight 430 can move upward along an inclination of the guide groove 411 due to inertia. At this time, the rotary holder 440 can be operated by the weight 430 to rotate the rotator 450. Referring to FIGS. 5A to 5C, when the weight 430 moves, the weight 430 presses the pressing surfaces 441 obliquely formed at the upper and lower portions of the rotary holder 440, respectively, so that the rotator 450 can rotate.

Figure 6:
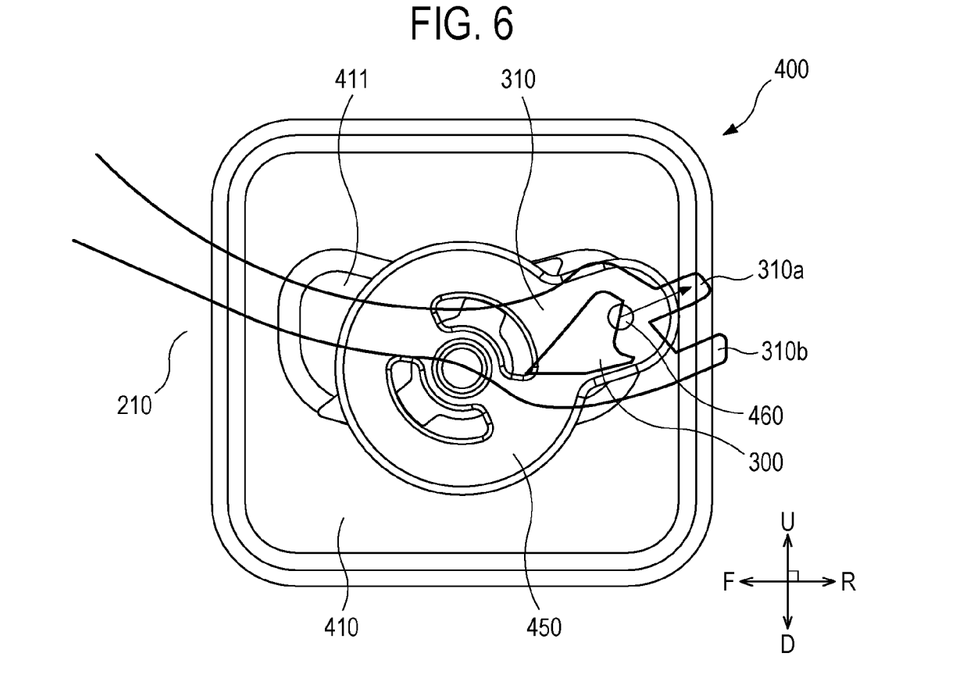
FIG. 6 is an operation state diagram showing a state in which a rotary pin is operated to enter a locking force maintaining groove when the weight of the locking device for a tray device shown in FIG. 2A is moved to rotate a rotator.

Referring to FIG. 6, in the state in which the rotator 450 is rotated by the movement of the weight 430, the rotary pin 460 can be drawn into the locking force maintaining groove 310a of the heart cam groove 310 of the tray cover 200, thereby the tray cover 200 can be kept locked.

Figure 7:
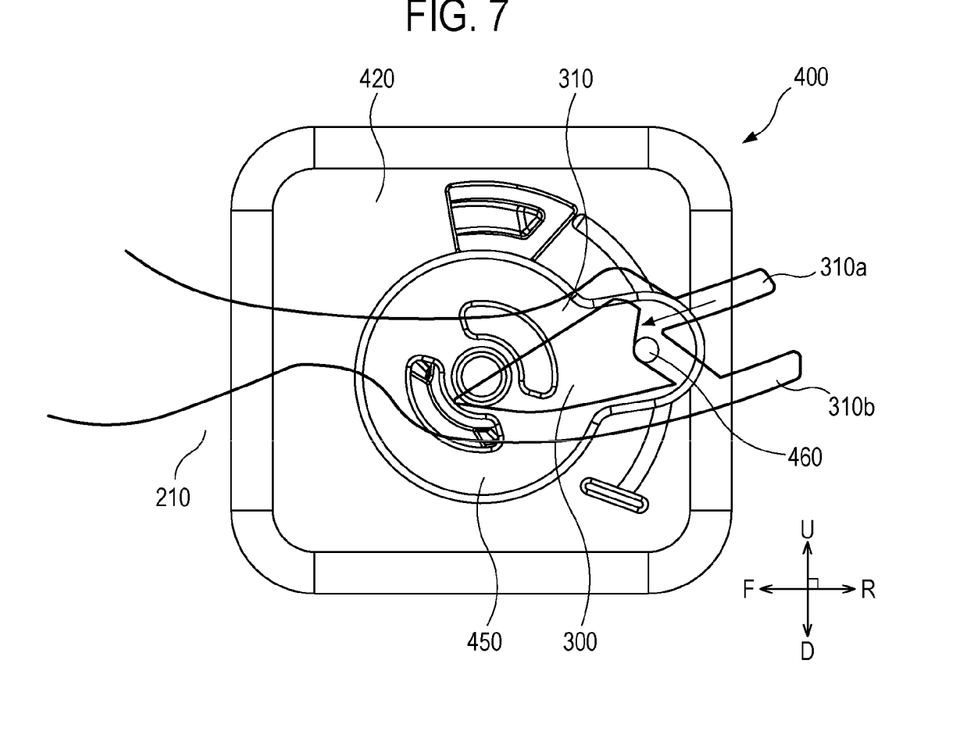
FIG. 7 is an operation state diagram showing a state in which the rotary pin is returned to an original position and caught in a heart cam when a tray cover is about to rotate with respect to a tray for opening in the state shown in FIG. 6.

Referring to FIG. 7, after the rotary pin 460 is drawn into the locking force maintaining groove 310a, when the rotary pin 460 is withdrawn from the locking force maintaining groove 310a, the rotary pin 460 is caught by the heart cam 300, thereby the tray cover 200 can be kept locked. At this time, a locking force is provided to the tray cover 200 by the heart cam 300 so that the tray cover 200 is not opened.

Figure 8:
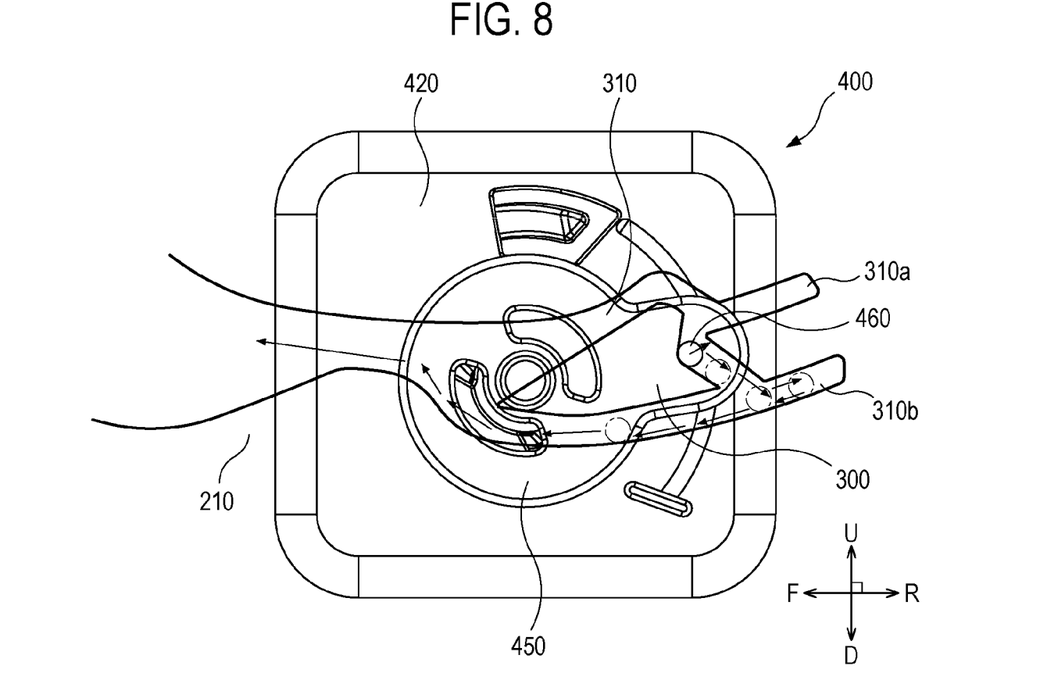
FIG. 8 is an operation state diagram showing a state in which the locking device for a tray device shown in FIG. 2A is operated while unlocking the tray cover.
Figure 9:
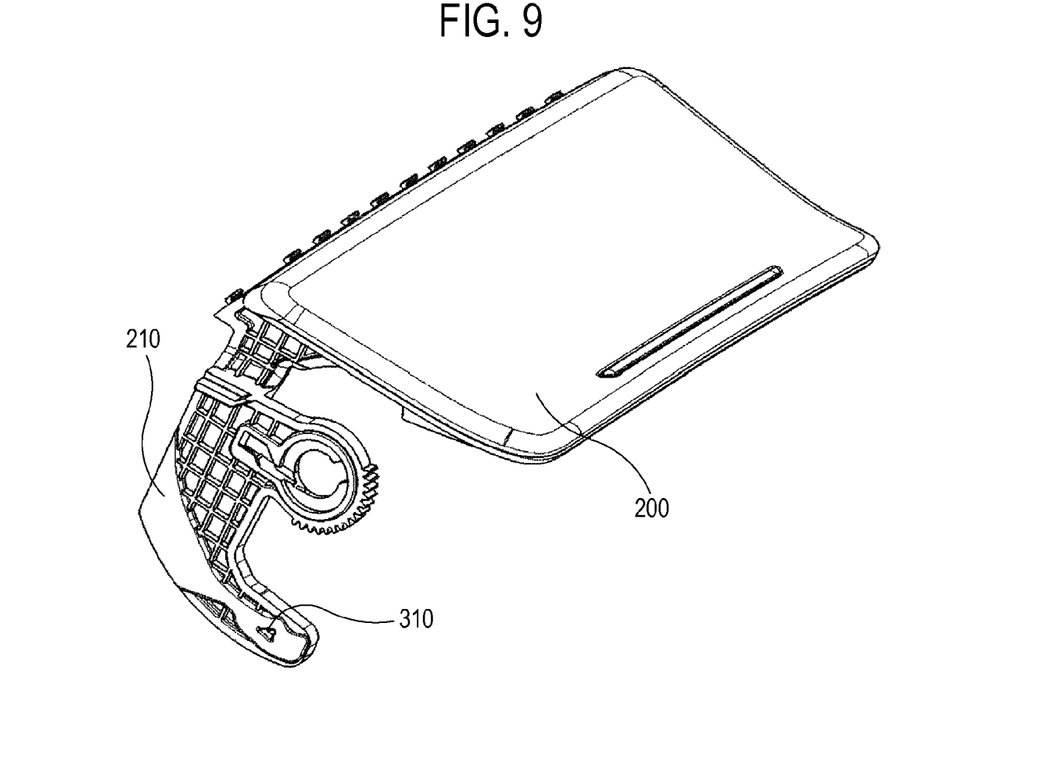
FIG. 9 is a perspective view showing the tray cover on which the locking device for the tray device shown in FIG. 2A is installed.

The weight 430 can be returned to the original position by its own weight. Referring to FIG. 8, in a state in which the locking device 400 does not operate (i.e., in a state in which the weight 430 is in the original position), the tray cover 200 may be unlocked as the rotary pin 460 moves along an inclination formed on the heart cam groove 310 of the heart cam 300. Accordingly, an occupant of the vehicle can use the tray 100 by opening the tray cover 200 as necessary.

According to an embodiment of the present disclosure, even when an external impact is applied to the tray cover from the front side or the rear side while a vehicle is being driven, the locked state of the tray cover can be maintained. Accordingly, it is possible to prevent articles inside the tray from spilling out due to opening of the cover, thereby greatly improving safety.

According to an embodiment of the present disclosure, even when an external impact is applied to the tray cover from the upper side or the lower side as well as from the front side or the rear side, the locked state of the tray cover can be maintained.

According to an embodiment of the present disclosure, the number of parts can be reduced so that the cost can be reduced when manufacturing a vehicle.

According to an embodiment of the present disclosure, it is possible to improve the marketability and reliability of a product.

While certain embodiments have been described, these embodiments have been presented by way of example only and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A tray device for a vehicle, comprising:
a tray having a storage space capable of storing an article;
a tray cover rotatably installed on the tray to open and close the storage space and including a coupling plate having a heart cam groove; and
a locking device fixedly installed on an outer surface of the tray,
wherein the locking device includes:
a rotary pin inserted into the heart cam groove;
a rotator to which the rotary pin is coupled to protrude from a surface of the rotator to one side direction;
a cover into which a portion of the rotator on the other side direction opposite to the one side direction is inserted therethrough;
a sensor housing fixedly coupled to a portion of the cover on the other side direction and having a guide groove formed to penetrate a middle portion of the sensor housing;
a weight seated in the guide groove and configured to move along the guide groove due to inertia when an impact load is transmitted to the tray; and
a rotary holder, to which the weight is movably coupled and the rotator is coupled, configured to rotate the rotator by being pushed by movement of the weight.

2. The tray device of claim 1, wherein the guide groove is formed so that both end portions of the guide groove in a front-rear direction are bent upward.

3. The tray device of claim 1, wherein the rotary holder includes pressing surfaces configured to pivotally rotate the rotary holder by being pushed by the movement of the weight and to be obliquely bent at upper and lower portions of the rotary holder, respectively.

4. The tray device of claim 1, wherein the locking device further includes a contact protrusion protruding from an edge of the guide groove in a direction facing the cover.

5. The tray device of claim 1, wherein the weight is configured to move from an original position due to inertia when the impact load is transmitted to the tray,
a locking force maintaining groove and an operation groove are formed in the heart cam groove,
the rotary pin is configured to be drawn into the locking force maintaining groove when the tray cover is pressed in a state in which the weight is moved from the original position due to inertia, and
the rotary pin is configured to be drawn into the operation groove when the tray cover is pressed in a state in which the weight is returned to the original position.

6. The tray device of claim 5, wherein the locking force maintaining groove is formed in the heart cam groove to be located in an upper direction of the operation groove.

7. The tray device of claim 1, wherein the locking device further includes an O-ring installed between the rotator and the cover to fill a gap between the rotator and the cover.

8. A locking device for a tray device, which is fixedly installed on an outer surface of a tray for a vehicle and configured to maintain a closed state of a tray cover in case of application of an external impact, comprising:
- a rotary pin configured to be inserted into a heart cam groove formed in the tray cover;
- a rotator to which the rotary pin is coupled to protrude from a surface of the rotator to one side direction;
- a cover into which a portion of the rotator on the other side direction opposite to the one side direction is inserted therethrough;
- a sensor housing fixedly coupled to a portion of the cover on the other side direction and having a guide groove formed to penetrate a middle portion of the sensor housing;
- a weight seated in the guide groove and configured to move along the guide groove due to inertia when an impact load is transmitted to the tray; and
- a rotary holder, to which the weight is movably coupled and the rotator is coupled, configured to rotate the rotator by being pushed by movement of the weight.

* * * * *